United States Patent
Pfadler et al.

(10) Patent No.: US 12,452,749 B2
(45) Date of Patent: Oct. 21, 2025

(54) METHODS FOR A RELAYING SYSTEM FOR IMPROVING A HANDOVER LIST, METHOD FOR A CELL, APPARATUS, VEHICLE AND COMPUTER PROGRAM

(71) Applicant: VOLKSWAGEN AKTIENGESELLSCHAFT, Wolfsburg (DE)

(72) Inventors: Andreas Pfadler, Berlin (DE); Luca Montero Bayo, Barcelona (ES)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 477 days.

(21) Appl. No.: 18/046,053

(22) Filed: Oct. 12, 2022

(65) Prior Publication Data
US 2023/0122490 A1   Apr. 20, 2023

(30) Foreign Application Priority Data

Oct. 15, 2021   (EP) .................................... 21202952

(51) Int. Cl.
*H04W 36/00* (2009.01)
(52) U.S. Cl.
CPC .............................. *H04W 36/00835* (2018.08)
(58) Field of Classification Search
CPC .............................................. H04W 36/00835
See application file for complete search history.

(56) References Cited

U.S. PATENT DOCUMENTS

| | | | |
|---|---|---|---|
| 9,629,041 B1* | 4/2017 | Oroskar | H04W 24/02 |
| 10,091,700 B1* | 10/2018 | Liu | H04W 40/026 |
| 10,154,440 B2 | 12/2018 | Cao | |
| 2012/0202505 A1* | 8/2012 | Kondo | H04W 36/08 455/436 |
| 2020/0178137 A1* | 6/2020 | Hassan Hussein | H04W 36/00837 |
| 2021/0084547 A1* | 3/2021 | Cheng | H04W 4/46 |
| 2021/0084558 A1* | 3/2021 | Speicher | H04W 36/22 |
| 2021/0084559 A1 | 3/2021 | Chaponniere et al. | |
| 2021/0084609 A1* | 3/2021 | Zisimopoulos | H04W 64/003 |

FOREIGN PATENT DOCUMENTS

| | | |
|---|---|---|
| EP | 2830356 A1 | 1/2015 |
| WO | 2021055370 A1 | 3/2021 |

OTHER PUBLICATIONS

Extended European Search Report; European Patent Application No. 21202952.4; Apr. 12, 2022.
Office Action; European Patent Application No. 21202952.4; Jun. 25, 2024.

* cited by examiner

*Primary Examiner* — Santiago Garcia
(74) *Attorney, Agent, or Firm* — BARNES & THORNBURG LLP

(57) ABSTRACT

A method for a relaying system for improving a handover list for user equipment connected to the relaying system which includes obtaining handover lists, obtaining a position of the relaying system, determining a handover list of the multiple handover lists based on the position of the relaying system, and transmitting the determined handover list to the user equipment.

19 Claims, 2 Drawing Sheets

METHODS FOR A RELAYING SYSTEM FOR IMPROVING A HANDOVER LIST, METHOD FOR A CELL, APPARATUS, VEHICLE AND COMPUTER PROGRAM

PRIORITY CLAIM

This patent application claims priority to European Patent Application No. 21202952.4, filed 15 Oct. 2021, the disclosure of which is incorporated herein by reference in its entirety.

SUMMARY

Illustrative embodiments relate to the field of wireless communication. Illustrative embodiments further relate to methods for a relaying system for improving a handover list, a method for user equipment, an apparatus, a transportation vehicle and a computer program, more particularly, but not exclusively, to a concept for improving a handover list, e.g., to improve a handover list of user equipment connected to the relaying system.

BRIEF DESCRIPTION OF THE DRAWINGS

Disclosed embodiments will be described in more detail below with reference to the accompanying figures, in which.

DETAILED DESCRIPTION

Figure 1:
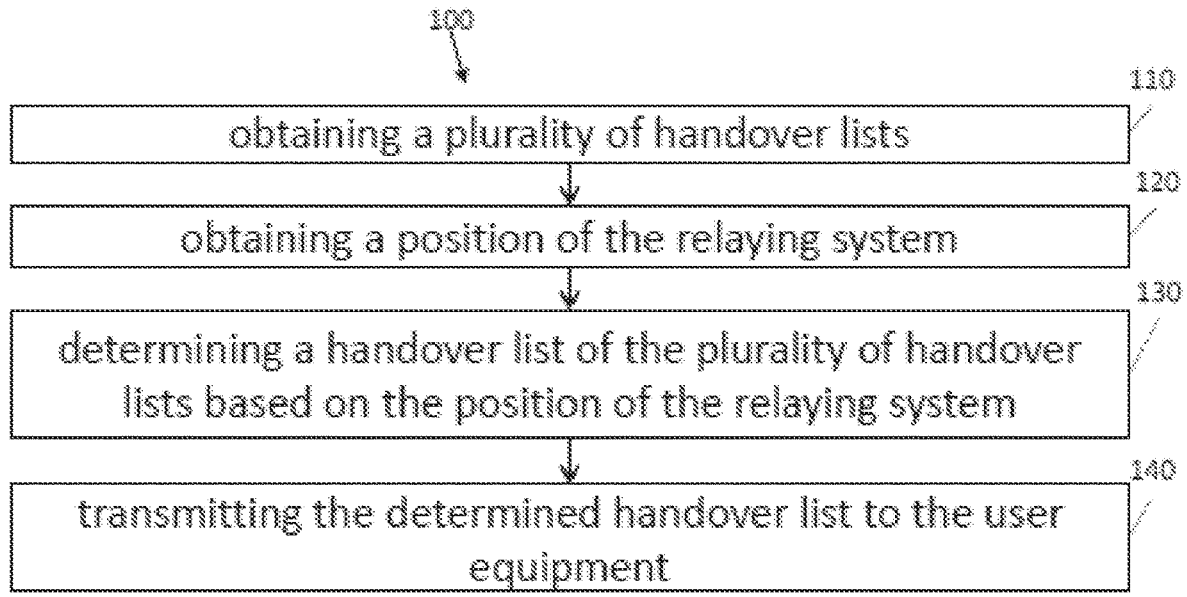
FIG. 1 shows an example of a disclosed method for a relaying system.

The development of 5G has brought increased attention to the automotive industry as a vertical manufacturer expected to leverage the most advanced features of the new generation of wireless communications. Among the main novelties of 5G, a wide range of spectrum possibilities (currently licensed up to the 28 GHz band—the first-ever Millimeter wave band for mobile use), enhanced support for high mobility scenarios and new mechanisms to guarantee and predict the experienced Quality of Service (QoS), have been established as key functions to support an increasingly connected transportation ecosystem.

U.S. Pat. No. 10,154,440 B2 reveals a method for performing handover of a mobile device at a mobile base station. The method comprises establishing, at a cellular base station, a relay connection with a second base station for backhaul and receiving a handover request for a mobile device. The handover request includes an IP address. Further, the method comprises receiving, at the cellular base station, a handover confirmation message from the mobile device following handover authorization for the mobile device and sending, from the cellular base station, a request to the mobile device to shut down a cellular radio connection with the cellular base station. The method also comprises establishing, a data connection with the mobile device.

However, for UE using a mobile communication device, e.g., a bus, train, transportation vehicle, etc., as Relaying System (RS) (e.g., as a new cell between in- or out-cabin mobile devices), it may be still a challenging task to know to which communication device it can connect, e.g., other cells, when terminating a connection to the mobile communication device. Therefore, there may be a need to improve a capability of UE to identify suitable communication device, e.g., a further RS, a stationary cell, etc., when the UE is already connected to a mobile communication device.

It is, therefore, a finding that a subsequent connection of UE can be improved by improving a handover list of the UE by a cell, especially by considering different position of the cell. This way, the UE can be informed about communication devices suitable for a connection.

Examples provide a method for a relaying system for improving a handover list for user equipment connected to the relaying system. The method comprises obtaining a plurality of handover lists and obtaining a position of the relaying system. Further, the method comprises determining a handover list of the plurality of handover lists based on the position of the relaying system and transmitting the determined handover list to the user equipment. This way, the UE may receive a handover list which is applicable for a defined position of the RS, e.g., at a bus stop of a bus acting as RS when a user of the UE leaves the bus.

In an example, the method may further comprise determining the handover list only if the relaying system is positioned at a predefined position. This way, a determination can be limited, e.g., to designated bus stops of a bus, which may reduce unnecessary communication to generate a handover list for non-required positions.

In an example, the method may further comprise receiving information about a destination of the user equipment and wherein determining of the handover list is only performed when the relaying system has reached the destination of the user equipment. This way, the handover list may be only determined if it is required.

Examples relates to a method for a relaying system for improving a handover list for user equipment connected to the relaying system. The method comprises comprising obtaining a plurality of handover lists and receiving information about a destination of the user equipment. Further, the method comprises determining a handover list of the plurality of handover lists based on the received destination and transmitting the determined handover list to the user equipment. This way, the RS can inform the UE in advance about available connections at a destination of the UE.

In an example, the method may further comprise receiving information about an alternative destination of the user equipment, determining an alternative handover list of the plurality of handover lists based on the received alternative destination and transmitting the determined alternative handover list to the user equipment. This way, the UE can select from different handover lists, e.g., for different destinations.

In an example, the method may further comprise obtaining communication capabilities of the user equipment and wherein determining the handover list of the plurality of handover lists is further based on the obtained communication capabilities. This way, the RS can adjust the handover list directly to a communication capability of the UE.

In an example, the method may further comprise receiving a desired communication parameter from the user equipment and wherein determining the handover list of the plurality of handover lists is further based on the desired communication parameter. This way, the RS can adjust the handover list directly to a desired communication parameter of the UE, e.g., to use a desired service, such like video streaming, video telephony, gaming application, etc.

In an example, if the desired communication parameter cannot be achieved for the position of the relaying system or the destination of the user equipment the method may further comprise determining a surrogate handover list for which the communication parameter can be achieved in an environment of the position of the relaying system or the destination of the user equipment and transmitting the surrogate handover list to the user equipment. This way, the UE can be informed about possible destination, which may enable the UE to use a desired service. Thus, a user of the UE may decide where to terminate the connection with the RS, e.g., where to leave the bus.

In an example, the information about the plurality of handover lists may be obtained by determining information about the plurality of handover lists from a database and/or receiving information from a communication device. This way, the plurality of handover list can be determined in an appropriated way.

In an example, the method may further comprise receiving a request for a handover list from the user equipment. This way, the RS can be informed about a need of the UE for a handover list.

In an example, the method may further comprise transmitting a desired communication parameter to the relaying system. This way, the RS can adjust the handover list directly to a desired communication parameter of the UE, e.g., to use a desired service, such like video streaming, video telephony, gaming application, etc.

Examples relates to a method for user equipment comprising transmitting information about a destination of its own to the relaying system and receiving a handover list at this destination and/or for this destination. This way, the UE can be informed by the RS about an appropriate communication device to connect to.

In an example, the method may further comprise determining whether a desired service of a user can be used with the handover list and if the desired service cannot be used using the handover list transmitting an alternative destination. This way, the UE may receive an alternative handover list for the alternative destination and the user may decide at which destination he wants to terminate the connection to the RS.

Examples further provide an apparatus, comprising one or more interfaces configured to communicate with a communication device or user equipment. The apparatus further comprises processing circuitry configured to control the one or more interfaces and to perform the method for user equipment and/or a communication device described above.

Examples further provide a transportation vehicle comprising the apparatus as described above.

Examples further relate to a computer program having a program code for performing the method described above, when the computer program is executed on a computer, a processor, or a programmable hardware component.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, operations, processes, elements, components and/or a group thereof, but do not exclude the presence or addition of one or more other features, integers, operations, processes, elements, components and/or a group thereof.

FIG. 1 shows an example of a method 100 for a communication device, e.g., a relaying system. The method 100 is for improving a handover list for user equipment connected to the relaying system. The method 100 comprises obtaining 110 a plurality of handover lists and obtaining 120 a position of the relaying system. Further, the method 100 comprises determining 130 a handover list of the plurality of handover lists based on the position of the relaying system and transmitting 140 the determined handover list to the user equipment.

For example, the communication device may be a mobile communication device, e.g., a mobile RS included in a bus, a train, a taxi, etc. The UE may be connected to the RS and may be located inside of a bus. Thus, the bus may block the UE to the surrounding, resulting in a decreased reception of the UE. For example, the UE may be not aware of a communication device outside of the bus, to which the UE could establish a connection. Thus, the RS of the bus may inform the UE about an unknown communication device, since the RS may sense its own environment in an improved way, since it is not block like the UE. By transmitting the handover list from the RS to the UE, the UE may be enabled to ease an establishment of a new connection after terminating the connection to the RS, e.g., after leaving the bus. This way, a subsequent connection of the UE can be improved. For example, the UE may receive the handover list at a bus stop and when the user of the UE leaves the bus the UE may utilize the handover list to establish a new connection to a communication device, e.g., a cell, after terminating the connection to the RS of the bus.

The UE may communicate in a mobile communication system with the communication device, e.g., the RS. For example, the UE and the communication device may communicate in/via a mobile communication system. The mobile communication system may comprise a plurality of transmission points and/or base stations operable to communicate radio signals with the UE. In an example, the mobile communication system may comprise the UE and the communication device.

A communication device, e.g., the RS, can be located in the fixed or stationary part of the network or system. A communication device may correspond to a remote radio head, a transmission point, an access point, a macro cell, a small cell, a micro cell, a pico cell, a femto cell, a metro cell etc. The term small cell may refer to any cell smaller than a macro cell, e.g., a micro cell, a pico cell, a femto cell, or a metro cell. Moreover, a femto cell is considered smaller than a pico cell, which is considered smaller than a micro cell. A communication device can be a wireless interface of a wired network, which enables transmission and reception of radio signals to UE, such as the UE. Such a radio signal may comply with radio signals as, for example, standardized by 3GPP or, generally, in line with one or more of the above listed systems. Thus, a communication device may correspond to a NodeB, an eNodeB, a BTS, an access point, etc. The communication device, e.g., the RS, may correspond to an intermediate network node in the communication path between the UE and a base station. The RS may forward a signal received from UE to a base station, signals received from the base station to the UE, respectively.

In some examples, the RS may also act as a small cell base station, e.g., as a pico cell or femto cell base station. In some examples, the RS may act as signal relay between the UE and a base station. In some examples, the RS may support simultaneous wireless backhaul connections to multiple base stations (of the same or different mobile network operators) and/or simultaneous wireless backhaul connections to the same base station over multiple radio access technologies (e.g., a mmWave-based and a sub-6 GHz-based wireless backhaul connection at the same). In particular, the RS may be associated with, and thus suitable for or configured to connecting/connect to, two or more wireless base stations of two or more mobile network operators. Additionally or alternatively, the RS may be associated with, and thus suitable for or configured to connecting/connect to, one or more base stations using two or more (different) radio access technologies. In some examples, the RS may act as a (internet protocol-based) gateway, suitable for data communication via two or more mobile network operators and/or two or more radio access technologies.

Various examples of the RS may improve the cellular coverage in a vehicle, such as the transportation vehicle. A RS may be used to connect multiple terminals (UE) inside of the transportation vehicle and provide an aggregated connection to a stationary cellular communication system via a wireless backhaul connection to a stationary cellular communications network, for example, over one or more external vehicle antennas. In the following the connection between a stationary base station and an external antenna of a vehicle relay node may be denoted as relay or backhaul connection; the connection between a relay node and end user terminals will be denoted as access connection.

Such a RS may, for example, correspond to a relay as defined in 3GPP Release 10 and following, e.g., a moving relay or mobile relay as introduced in connection with 3GPP Release 12 and following, a wireless repeater (analog or digital), or a femto cell with a wireless backhaul connection. In case of a femto cell, the wireless backhaul connection could be provided over a separate cellular communication terminal, e.g., a 2G/3G/4G/5G modem. It is another finding that for the relay connection and for the access connection, respectively, the same or different frequency and spectrum resources can be used.

The mobile communication system may be cellular. The term cell refers to a coverage area of radio services provided by a transmission point, a remote unit, a remote head, a remote radio head, communication device, UE or a NodeB, an eNodeB, respectively. The terms cell and base station may be used synonymously. A wireless communication device, e.g., the UE, can be registered or associated with at least one cell (e.g., the communication device), e.g., it can be associated to a cell such that data can be exchanged between the network and the mobile in the coverage area of the associated cell using a dedicated channel, connection or connection.

In general, the UE is a device that is capable of communicating wirelessly. In particular, however, the UE and/or the communication device (RS) may be mobile, e.g., UE that is suitable for being carried around by a user. For example, the UE may be a User Terminal (UT) or User Equipment (UE) within the meaning of the respective communication standards being used for mobile communication. For example, the UE may be a mobile phone, such as a smartphone, or another type of mobile communication device, such as a smartwatch, a laptop computer, a tablet computer, or autonomous augmented-reality glasses. For example, the communication device may be a RS comprised by a transportation vehicle. For example, the UE and the communication device may be configured to communicate in a cellular mobile communication system. Accordingly the UE and the communication device may be configured to communicate in a cellular mobile communication system, for example, in a Sub-6 GHz-based cellular mobile communication system (covering frequency bands between 500 MHz and 6 GHz) or in a mmWave-based cellular mobile communication system (covering frequency bands between 20 GHz and 60 GHz). For example, the UE and the communication device may be configured to communicate in a mobile communication system/cellular mobile communication system. In general, the mobile communication system may, for example, correspond to one of the Third Generation Partnership Project (3GPP)-standardized mobile communication networks, where the term mobile communication system is used synonymously to mobile communication network. The mobile communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

In addition the UE/communication device may be suitable for, or configured to, communicating/communicate via non-cellular communication systems, e.g., via a device-to-device vehicular communication system, e.g., according to the IEEE 802.11p standard (Institute of Electrical and Electronics Engineers standard 802.11p for vehicular communication) or via a wireless local area network (e.g., according to IEEE 802.11a, IEEE 802.11b, IEEE 802.11g, IEEE 802.11n, IEEE 802.11ac or IEEE 802.11ax, also known as Wi-Fi 1 through Wi-Fi 6(E)). In particular, the UE and the communication device may be suitable for, or configured to, communicating/communicate in the frequency band between 5 GHz and 7.1 GHz, which covers communication in the 5 GHz band (for WiFi in the 5 GHz band), 5.9 GHz band (for vehicular communication according to the 802.11p standard) and between 5.9 GHz and 7.1 GHz (for WiFi in the 6 GHz band).

A connection between the UE and the communication device may be a wireless connection, e.g., a mmWave-based connection over the mobile communication system (e.g., using carrier frequencies of at least 20 GHz) or may be performed at lower carrier frequencies, e.g., using carrier frequencies of at most 7.5 GHz. For example, the wireless connection between the UE and the communication device may be initiated using the protocols of the mobile communication system, or using a short-range communication system, such as via a wireless local area network outlined above.

As is evident from the above example, while the communication between UE and communication device occurs via the mobile communication system, additional communication and/or alternatively communication (e.g., the communication device is a transportation vehicle) between the UE and the communication device may occur via a vehicular communication system. Such communication may be carried out directly, e.g., by Device-to-Device (D2D) communication. Such communication may be carried out using the specifications of the vehicular communication system. An example of D2D is direct communication between transportation vehicles, also referred to as Vehicle-to-Vehicle communication (V2V) or Vehicle-to-Everything (V2X), car-to-car, Dedicated Short Range Communication (DSRC), respectively. Technologies enabling such D2D-communication include 802.11p, 3GPP systems (4G, 5G, NR and beyond), etc.

A handover list (also named neighbor list) comprises communication devices, e.g., cells, which are checked more frequently than the rest of communication devices and thus a handover with a cell of the handover list is more likely. Optionally, the UE may only be allowed to connect to a cell comprised by the handover list (like in Global System for Mobile Communications).

Obtaining 110 a plurality of handover lists may be done by generating the plurality of handover lists using information received from the plurality of communication devices, loading the plurality of handover lists (e.g., from a storage media) and/or by receiving the plurality of handover lists (e.g., from an infrastructure such like a bus shelter, traffic light for a train, etc.). For example, the RS may receive information from the plurality of communication devices using a search finger and based on this the RS may generate a handover list. Optionally or alternatively, a bus shelter may comprise a communication device and may use a search finger to generate a handover list, which can be transmitted to the RS, for example. For example, a plurality of bus shelters may be connected to a communication device, which is configured to share the handover list of each bus shelter corresponding to the position of the bus shelter among the plurality of bus shelters. This way, a bus shelter may transmit a plurality of handover lists to the RS, e.g., for positions of bus shelters in the environment of a bus shelter.

Obtaining 120 a position of the relaying system can be performed by any suitable measure, e.g., by use of a global positioning system.

Determining 130 a handover list can be performed by a processing circuitry of the RS. For example, each handover list of the plurality of handover list may be assigned to a position, e.g., a bus stop. Thus, the RS may determine the handover list assigned to the position of the RS for transmitting 140.

Transmitting 140 the handover list may be performed by any suitable message, e.g., by a broadcast message, groupcast message or unicast message. Thus, the handover list can be transmitted in a desired way, e.g., using a broadcast message.

In an example, the method 100 may further comprise determining the handover list only if the relaying system is positioned at a predefined position. For example, the handover list may be only determined if the RS stops at a stop on a route. This way, the RS may receive from an infrastructure at the stop a plurality of handover lists, which can be used to determine 130 the handover list for transmitting 140. For example, the RS may perform a finger search at the stop and may sense communication devices in the surrounding to generate a handover list, which can be considered for determining 130 a handover list from the plurality of handover lists.

In an example, the method 100 may further comprise receiving information about a destination of the user equipment and wherein determining of the handover list is only performed when the relaying system has reached the destination of the user equipment. This way, a handover list obtained by the RS, e.g., by a finger search, can be improved.

For example, the information about a destination of the UE may be determined during a purchase process. The UE, e.g., a smartphone, may be used for purchasing a ticket for public transport. During this purchase process a user of the UE may select a destination to purchase the ticket. This information may be transmitted to the RS. For example, the user of the UE may book a taxi ride, and thus the user may select a destination for the cab ride, which could be transmitted to the RS.

More details and features are mentioned in connection with the embodiments described above and/or below. The example shown in FIG. 1 may comprise one or more optional additional features corresponding to one or more facets mentioned in connection with the proposed concept or one or more examples described below (e.g., FIG. 2-4).

Figure 2:
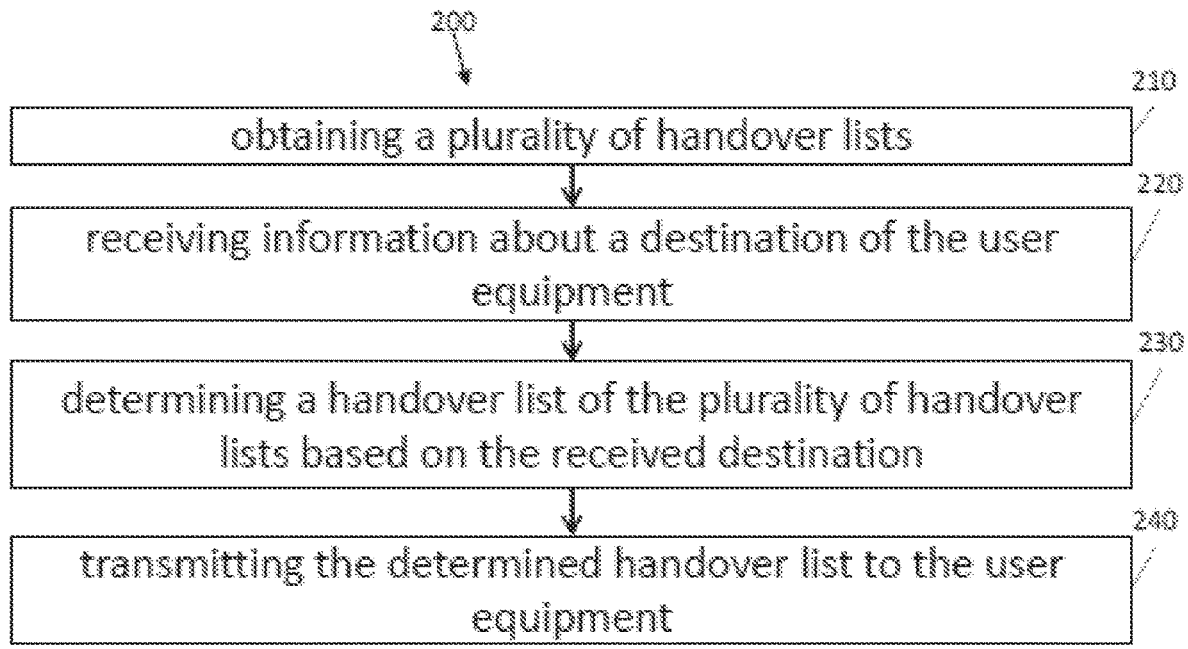
FIG. 2 shows an example of a further disclosed method for a relaying system.

FIG. 2 shows an example of a method 200 for a relaying system. The method 200 is for improving a handover list for user equipment connected to the relaying system. The method 200 comprises obtaining 210 a plurality of handover lists and receiving 220 information about a destination of the user equipment. Further, the method 200 comprises determining 230 a handover list of the plurality of handover lists based on the received destination and transmitting 240 the determined handover list to the user equipment. This way, the UE can be informed in advance about available connections at a destination of the UE. Thus, a user of the UE can decide whether the available connection is satisfying or not and may decide to change its destination to an alternative destination (e.g., a stop earlier or later), for example. The user may receive an alternative handover list for the alternative destinations which may comprise a satisfying communication device to connect to and thus the user may change its destination to achieve a desired connection. This way, a user experience can be improved, e.g., by offering a smooth service such like video streaming, video telephony, gaming, etc.

In an example, the method 200 may further comprise receiving information about an alternative destination of the user equipment, determining an alternative handover list of the plurality of handover lists based on the received alternative destination and transmitting the determined alternative handover list to the user equipment. This way, the RS may provide the UE an alternative handover list on request.

In an example, the method 200 may further comprise obtaining communication capabilities of the user equipment and wherein determining the handover list of the plurality of handover lists is further based on the obtained communication capabilities. For example, the communication capability may comprise information about a radio access technology, a supported signal intensity, a signal-to-noise ratio (SNR), a latency time, a data rate, a capacity, etc. This way, a user of the UE can be informed about parameter of available connections. For example, the user may notify that at his destination a download rate for video streaming cannot be achieved and thus the user may decide to change his destination to an alternative destination. This way, the user can use the service of his UE without interruption which may improve an experience of the user.

In an example, the method 200 may further comprise receiving a desired communication parameter from the user equipment and wherein determining the handover list of the plurality of handover lists is further based on the desired communication parameter. This way, the RS may determine a handover list for a position at which the desired communication parameter is available for an available connection. For example, the user of the UE may want to use a service requiring a high download rate and thus the RS may determine a position at which the user can use this service. Thus, the user can be informed about an alternative destination at which he can use his service.

In an example, if the desired communication parameter cannot be achieved for the position of the relaying system or the destination of the user equipment the method 200 may further comprise determining a surrogate handover list for which the communication parameter can be achieved in an environment of the position of the relaying system or the destination of the user equipment and transmitting the surrogate handover list to the user equipment. The surrogate handover list may be an alternative handover list, e.g., a handover list for a bus stop next to a destination of the UE. This way, the UE may determine an improved handover list (e.g., the surrogate handover list) without being instructed by the UE about a possible alternative destination. Thus, the RS may suggest a different destination to the UE, which can be used to achieve a desired communication parameter.

In an example, the information about the plurality of handover lists may be obtained by loading information about the plurality of handover lists from a database and/or receiving information from a communication device. For example, the RS may comprise/be connected to a storage media in which the plurality of handover lists may be stored. The RS may receive the plurality of handover lists from a communication device, e.g., a base station, a central server for public transport, etc. Further, the RS may receive periodically updates of the plurality of handover lists. This way, the plurality of handover lists can be actualized in an eased and used to determine 240 the handover list, e.g., in advance before reaching a destination.

In an example, the method 200 may comprise receiving a request for a handover list from the user equipment. This way, the RS can be informed about a need of a handover list.

More details and features are mentioned in connection with the embodiments described above and/or below. The example shown in FIG. 2 may comprise one or more optional additional features corresponding to one or more facets mentioned in connection with the proposed concept or one or more examples described above (FIG. 1) and/or below (e.g., FIG. 3-4).

Figure 3:
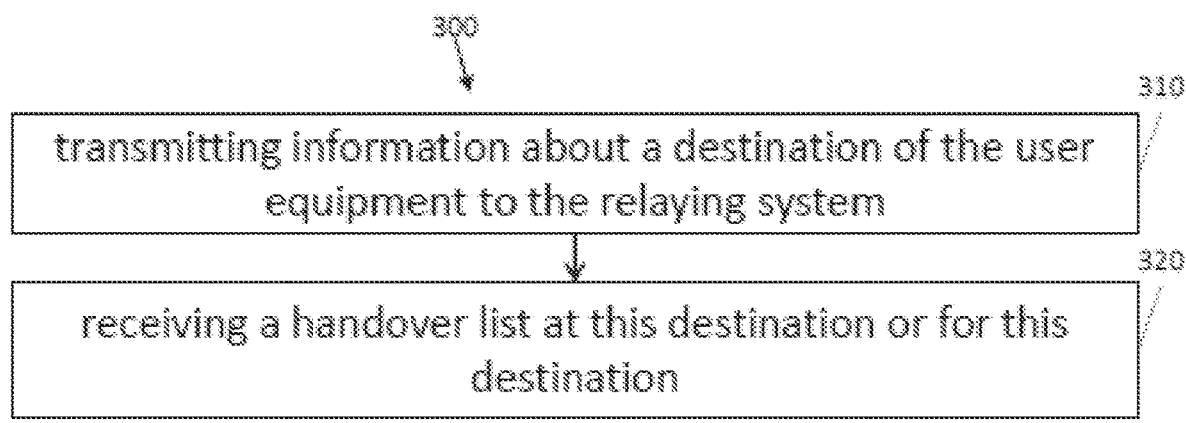
FIG. 3 shows an example of a disclosed method for user equipment.

FIG. 3 shows an example of a method 300 for user equipment. The method 300 for improving a handover list of the UE connected to a RS (e.g., the RS described with reference to FIG. 1 and FIG. 2) comprises transmitting 310 information about a destination of its own to the relaying system and receiving 320 a handover list at this destination and/or for this destination. Thus, the UE may be informed about possible connection to a communication device at a destination in an improved way.

In an example, the method 300 may further comprise determining whether a desired service of a user can be used with the received handover list and if the desired service cannot be used using the handover list transmitting information about an alternative destination of the user equipment to the relaying system. This way, the UE can automatically transmit an alternative destination to the RS and may receive an alternative handover list for the alternative destination. Thus, a user can be informed directly that at the destination a service may be non-available and at the alternative destination the service may be available.

In an example, the method 300 may further comprise transmitting a desired communication parameter to the relaying system. This way the UE can enable the RS to search for handover lists, which provide the communication parameter. Thus, the RS can transmit a plurality of handover lists for different locations to the UE, such that a user of the UE can select a desired destination, for example.

More details and features are mentioned in connection with the embodiments described above and/or below. The example shown in FIG. 2 may comprise one or more optional additional features corresponding to one or more facets mentioned in connection with the proposed concept or one or more examples described above (FIGS. 1-2) and/or below (e.g., FIG. 4).

Figure 4:
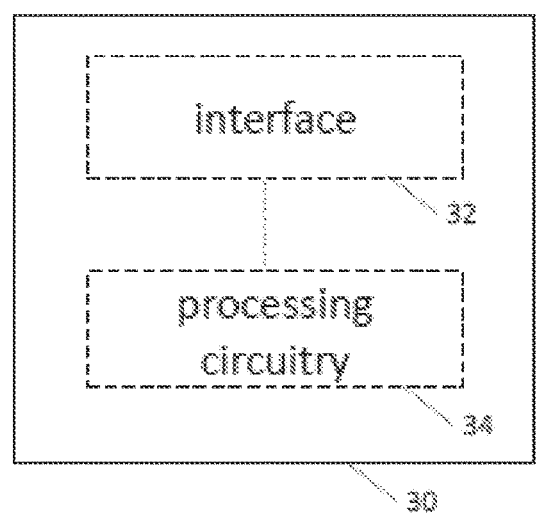
FIG. 4 shows a block diagram of a disclosed apparatus.

FIG. 4 shows a block diagram of an apparatus 30. The apparatus 30 comprises one or more interfaces 32 configured to communicate with a communication device or user equipment. The apparatus 30 further comprises processing circuitry 34 configured to control the one or more interfaces and to perform the method for a relaying system described above (e.g., described with respect to FIG. 1 and FIG. 2) and/or the method for user equipment described above (e.g., described with respect to FIG. 3).

For example, the apparatus 30 can be the relaying system, where the interface is configured to communicate with the UE. Alternatively, the apparatus 30 can be the UE, where the interface 32 is configured to communicate with the relaying system.

As shown in FIG. 4 the respective one or more interfaces 32 are coupled to the respective processing circuitry 34 at the apparatus 30. In examples the processing circuitry 34 may be implemented using one or more processing units, one or more processing devices, any method or mechanism for processing, such as a processor, a computer or a programmable hardware component being operable with accordingly adapted software. Similar, the described functions of the processing circuitry 34 may as well be implemented in software, which is then executed on one or more programmable hardware components. Such hardware components may comprise a general-purpose processor, a Digital Signal Processor (DSP), a micro-controller, etc. The processing circuitry 34 is capable of controlling the interface 32, so that any data transfer that occurs over the interface and/or any interaction in which the interface may be involved may be controlled by the processing circuitry 34. For example, the apparatus 30 can be comprised by a transportation vehicle. For example, the transportation vehicle may be a land vehicle, such a road vehicle, a car, an automobile, an off-road vehicle, a motor vehicle, a bus, a robo-taxi, a van, a truck or a lorry. Alternatively, the transportation vehicle may be any other type of vehicle, such as a train, a subway train, a boat or a ship. For example, the proposed concept may be applied to public transportation (trains, bus) and future methods or mechanisms of mobility (e.g., robo-taxis).

In an exemplary embodiment, the apparatus 30 may comprise a memory and at least one processing circuitry 34 operably coupled to the memory and configured to perform the below mentioned method.

In examples the one or more interfaces 32 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, e.g., transmit or receive signals, information with further internal or external components. The one or more interfaces 32 may comprise further components to enable communication between transportation vehicles. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc.

More details and features are mentioned in connection with the embodiments described above. The example shown in FIG. 4 may comprise one or more optional additional features corresponding to one or more facets mentioned in connection with the proposed concept or one or more examples described above (FIG. 1-3).

The facets and features described in relation to a particular one of the previous examples may also be combined with one or more of the further examples to replace an identical or similar feature of that further example or to additionally introduce the features into the further example.

Examples may be compliant to or even comprised in certain standard specifications, such as those specified by the 3GPP. Configuration information may, for example, be communicated using signaling radio bearers, e.g., by Radio Resource Control (RRC) messages, which are, for example, specified in the *.331 series of 3GPP as layer 3 control plane messages. For example, physical layer specification, e.g., by Doppler Delay Resolutions and other physical layer specifications may also be affected by disclosed embodiments, e.g., *.201, *.211, *.212, *.213, *.214, *.216 series in the 3GPP specifications.

Examples may further be or relate to a (computer) program including a program code to execute one or more of the above methods when the program is executed on a computer, processor or other programmable hardware component. Thus, operations or processes of different ones of the methods described above may also be executed by programmed computers, processors or other programmable hardware components. Examples may also cover program storage devices, such as digital data storage media, which are machine-, processor- or computer-readable and encode and/or contain machine-executable, processor-executable or computer-executable programs and instructions. Program storage devices may include or be digital storage devices, magnetic storage media such as magnetic disks and magnetic tapes, hard disk drives, or optically readable digital data storage media, for example. Other examples may also include computers, processors, control units, (Field) Programmable Logic Arrays ((F)PLAs), (Field) Programmable Gate Arrays ((F)PGAs), Graphics Processor Units (GPU), Application-Specific Integrated Circuits (ASICs), Integrated Circuits (ICs) or System-On-a-Chip (SoCs) systems programmed to execute the operations of the methods described above.

It is further understood that the disclosure of several processes, operations or functions disclosed in the description or claims shall not be construed to imply that these operations are necessarily dependent on the order described, unless explicitly stated in the individual case or necessary for technical reasons. Therefore, the previous description does not limit the execution of several operations or functions to a certain order. Furthermore, in further examples, a single function, process or operation may include and/or be broken up into several sub-functions, -processes or -operations.

If some features have been described in relation to a device or system, these facets should also be understood as a description of the corresponding method. For example, a block, device or functional facet of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

If some features have been described in relation to a device or system, these facets should also be understood as a description of the corresponding method and vice versa. For example, a block, device or functional facet of the device or system may correspond to a feature, such as a method operation, of the corresponding method. Accordingly, features described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The facets and features described in relation to a particular one of the previous examples may also be combined with one or more of the further examples to replace an identical or similar feature of that further example or to additionally introduce the features into the further example.

LIST OF REFERENCE SIGNS 30 apparatus
32 interface
34 processing circuitry
100 method for a relaying system
110 obtaining a plurality of handover lists
120 obtaining a position of the relaying system
130 determining a handover list of the plurality of handover lists
140 transmitting the determined handover list to the user equipment
200 method for a relaying system
210 obtaining a plurality of handover lists
220 receiving information about a destination
230 determining a handover list of the plurality of handover lists 240 transmitting the determined handover list to the user equipment
300 method for user equipment
310 transmitting information about a destination of the user equipment
320 receiving a handover list at this destination or for this destination

The invention claimed is:

1. An apparatus for a mobile relaying system for improving a handover list for user equipment connected to the mobile relaying system, the apparatus comprising:
one or more interfaces configured to communicate with a communication device; and
processing circuitry configured to control the one or more interfaces and configured to:
obtain a plurality of handover lists, wherein each handover list of the plurality of handover lists is assigned to a Global Positioning system (GPS) position;
obtain a GPS position of the mobile relaying system;
determine a handover list of the plurality of handover lists based on the GPS position of the mobile relaying system only in response to the mobile relaying system being located at a predefined GPS position assigned to the handover list; and
transmit the determined handover list to the user equipment.

2. A transportation vehicle comprising the apparatus of claim 1.

3. The apparatus of claim 1, wherein the processing circuitry is further configured to control the one or more interfaces to receive information about a destination of the user equipment, which is used to determine the handover list only when the mobile relaying system is located at the destination of the user equipment.

4. An apparatus for a mobile relaying system for improving a handover list for user equipment connected to the mobile relaying system, the apparatus being configured to:
obtain a plurality of handover lists, wherein each handover list of the plurality of handover lists is assigned to a Global Positioning system (GPS) position;
receive information about a destination of the user equipment;
determine a handover list of the plurality of handover lists based on the received destination only in response to the mobile relaying system being located at a predefined GPS position assigned to the handover list; and
transmit the determined handover list to the user equipment.

5. The apparatus of claim 4, wherein the processing circuitry is further configured to control the one or more interfaces to:
receive information about an alternative destination of the user equipment;
determine an alternative handover list of the plurality of handover lists based on the received alternative destination; and
transmit the determined alternative handover list to the user equipment.

6. The apparatus of claim 4, wherein the processing circuitry is further configured to control the one or more interfaces to:
obtain communication capabilities of the user equipment, wherein the determining of the handover list of the plurality of handover lists is further based on the obtained communication capabilities.

7. The apparatus of claim 4, wherein the processing circuitry is further configured to control the one or more interfaces to:
receive a desired communication parameter from the user equipment,
wherein the determining of the handover list of the plurality of handover lists is further based on the desired communication parameter.

8. The apparatus of claim 7, wherein, in response to the desired communication parameter not being achieved for the GPS position of the mobile relaying system or the destination of the user equipment, a surrogate handover list is determined for which the communication parameter is achieved in an environment of the GPS position of the mobile relaying system or the destination of the user equipment.

9. The apparatus of claim 4, wherein the information about the plurality of handover lists is obtained by determining information about the plurality of handover lists from a database and/or receiving information from a communication device.

10. A method for a mobile relaying system for improving a handover list for user equipment connected to the mobile relaying system, the method comprising:
obtaining a plurality of handover lists, wherein each handover list of the plurality of handover lists is assigned to a Global Positioning system (GPS) position;
obtaining a GPS position of the mobile relaying system;
determining a handover list of the plurality of handover lists based on the GPS position of the mobile relaying system only in response to the mobile relaying system being located at a predefined GPS position assigned to the handover list; and
transmitting the determined handover list to the user equipment.

11. The method of claim 10, further comprising determining the handover list is only performed when the mobile relaying system is located at a predefined position.

12. The method of claim 10, further comprising:
receiving information about a destination of the user equipment; and
wherein determining of the handover list is only performed when the mobile relaying system is located at the destination of the user equipment.

13. A method for a mobile relaying system for improving a handover list for user equipment connected to the mobile relaying system, the method comprising:
obtaining a plurality of handover lists, wherein each handover list of the plurality of handover lists is assigned to a Global Positioning system (GPS) position;
receiving information about a destination of the user equipment;
determining a handover list of the plurality of handover lists based on the received destination only in response to the mobile relaying system being located at a predefined GPS position assigned to the handover list; and
transmitting the determined handover list to the user equipment.

14. The method of claim 13, further comprising:
receiving information about an alternative destination of the user equipment;
determining an alternative handover list of the plurality of handover lists based on the received alternative destination; and transmitting the determined alternative handover list to the user equipment.

15. The method of claim 13, further comprising:
obtaining communication capabilities of the user equipment; and
wherein determining the handover list of the plurality of handover lists is further based on the obtained communication capabilities.

16. The method of claim 13, further comprising:
receiving a desired communication parameter from the user equipment; and
wherein determining the handover list of the plurality of handover lists is further based on the desired communication parameter.

17. The method of claim 16, wherein, in response to the desired communication parameter not being achieved for the GPS position of the mobile relaying system or the destination of the user equipment, the method further comprises determining a surrogate handover list for which the communication parameter is achieved in an environment of the GPS position of the mobile relaying system or the destination of the user equipment.

18. The method of claim 13, wherein the information about the plurality of handover lists is obtained by determining information about the plurality of handover lists from a database and/or receiving information from a communication device.

19. A non-transitory computer readable medium including a computer program having a program code for performing the method of claim 10, when the computer program is executed on a computer, a processor, or a programmable hardware component.

* * * * *